United States Patent
Stoupis et al.

(10) Patent No.: US 9,520,717 B2
(45) Date of Patent: Dec. 13, 2016

(54) DISTRIBUTED ELECTRICAL POWER NETWORK MODEL MAINTENANCE

(75) Inventors: James Dimitrios Stoupis, Durham, NC (US); Zhenyuan Wang, Cary, NC (US)

(73) Assignee: ABB Research Ltd., Zurich (CH)

( * ) Notice: Subject to any disclaimer, the term of this patent is extended or adjusted under 35 U.S.C. 154(b) by 768 days.

(21) Appl. No.: 13/450,043

(22) Filed: Apr. 18, 2012

(65) Prior Publication Data
US 2013/0282189 A1 Oct. 24, 2013

(51) Int. Cl.
G05D 16/20 (2006.01)
H02J 3/00 (2006.01)

(52) U.S. Cl.
CPC ............ *H02J 3/00* (2013.01); *H02J 2003/007* (2013.01); *Y02E 60/76* (2013.01); *Y04S 40/22* (2013.01)

(58) Field of Classification Search
CPC ......... G05B 13/04; H02J 4/00; H02J 13/0079; H02J 3/00; H02J 2003/007; Y02E 60/76; Y04S 40/22
USPC ....................................................... 700/286
See application file for complete search history.

(56) References Cited

U.S. PATENT DOCUMENTS

| | | | | |
|---|---|---|---|---|
| 8,271,147 B2* | 9/2012 | Beal | ........................ | H02J 3/14 700/20 |
| 8,583,291 B2* | 11/2013 | Beal | ........................ | H02J 3/14 700/291 |
| 8,738,351 B2* | 5/2014 | Coyne | ................ | G06F 17/5022 703/18 |
| 2009/0089608 A1* | 4/2009 | Guzman-Casillas | ......... | 713/340 |
| 2010/0217450 A1* | 8/2010 | Beal | ........................ | H02J 3/14 700/291 |
| 2011/0004355 A1 | 1/2011 | Wang et al. | | |
| 2012/0029720 A1* | 2/2012 | Cherian et al. | ............... | 700/297 |
| 2012/0089384 A1* | 4/2012 | Coyne | ................ | G06F 17/5022 703/18 |

(Continued)

FOREIGN PATENT DOCUMENTS

| EP | 2081123 A1 | 7/2009 |
|---|---|---|
| WO | 2012/015508 A1 | 2/2012 |

OTHER PUBLICATIONS

Shivener, Gary, "Model Maintenance", Milsoft Utility Solutions, Inc., Retrieved on Mar. 7, 2012, pp. 1-17, https://milsoft.com/smart-grid/images/uc2009/presentations/oms/Model%20Maintenance%20-%20Gary%20Shivener.pdf.

(Continued)

*Primary Examiner* — Charles Kasenge
(74) *Attorney, Agent, or Firm* — Cooper Legal Group, LLC

(57) ABSTRACT

Among other things, one or more techniques and/or systems are provided for maintaining a distributed electrical power network model associated with a power grid. A global power network model, comprising a global logical representation of the power grid, is maintained at a network control center configured to manage one or more substations associated with the power grid. The network control center hosts grid management applications that utilize the global power network model. A local power network model, comprising a local logical representation of a power grid territory within the power grid monitored by a substation, is maintained at the substation. The substation hosts one or more local grid management applications that utilize the local power network model. The global power network model and the local power network model are synchronized in response to events occurring within the power grid.

20 Claims, 12 Drawing Sheets

(56) References Cited

U.S. PATENT DOCUMENTS

2013/0103216 A1* 4/2013 Beal .................... H02J 3/14
  700/291

OTHER PUBLICATIONS

"SISCO's Utility Integration Bus—UIB Standardized ESB Extensions for Utilities", Systems Integration Specialists Company, Inc., Oct. 4, 2008, pp. 1-4, http://www.sisconet.com/downloads/MktLit_uib.pdf.

McNaughton, et al., "How NRECA's MultiSpeak Specification Supports Interoperability of Divers Electric Grid Automation Systems", Grid-Interop Forum, 2007, pp. 1-6, http://www.gridwiseac.org/pdfs/forum_papers/118_paper_final.pdf.

Int. Search Report cited in PCT Application No. PCT/US2013/037055 dated Aug. 7, 2013, 9 pgs.

* cited by examiner

DISTRIBUTED ELECTRICAL POWER NETWORK MODEL MAINTENANCE

BACKGROUND

A power grid, such as an electrical grid, may be configured to provide electricity from suppliers to consumers. The power grid may be associated with one or more substations configured to provide electricity distribution functionality. The grid may be managed by a distribution management system (DMS). For example, in a DMS a substation may comprise a substation computer configured to communicate with one or more field intelligent electronic devices (IEDs), such as electronic relays, capacitor bank controllers, electronic fault indicators, smart electricity meters, and/or other distribution network sensors and/or controllers. The substation computer may comprise computational resources, such as a programmable logic controller (PLC), that may execute various tasks associated with the power grid.

A network control center may be configured to manage one or more substations. The network control center may comprise sophisticated computational hardware (e.g., multi-core processors) configured to provide real-time processing of data associated with the power grid. For example, the network control center may maintain a global power network model logically representing components within the power grid. The network control center may host various grid management applications, such as fault detection isolation restoration (FDIR) applications, network reconfiguration applications, voltage volt-ampere reactive (var) control applications, etc., that may utilize the global power network model. In this way, a grid management application, hosted by the network control center, may send control commands to substations based upon the global power network model.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques related to maintaining a distributed electrical power network model associated with a power grid are provided herein. A network control center may be configured to manage one or more substations associated with the power grid. The network control center may be configured to maintain a global power network model. The global power network model may comprise a global logical representation of components within the power grid (e.g., transformers, circuit breakers, load changers, wires, etc.). Grid management applications hosted by the network control center may utilize the global power network model during execution. For example, a network reconfiguration application may balance loads amongst one or more transformers within the power grid based upon load data and/or transformer data within the global power network model.

As provided herein, local power network models and/or execution of grid management applications may be distributed to one or more substations (e.g., substation computers) within the power grid. For example, a first local power network model may be maintained at a first substation. The first local power network model may comprise a local logical representation of the power grid associated with the first substation (e.g., information associated with components within a first power grid territory of the power grid monitored by the first substation). That is, the first local power network model may be maintained at the first substation instead of the global power network model because the global power network model may comprise an amount of data that the first substation may be unable to maintain within memory and/or process (e.g., a local grid management application hosted by the first substation may be unable to perform operations in real-time based upon the amount of information within the global power network model). Accordingly, the first local power network model may comprise a localized representation of the power grid associated with the first substation (e.g., a portion of the power grid managed by the first substation). In this way, execution of local grid management applications may be hosted by the first substation based upon the first local power network model.

The global power network model maintained at the network control center and one or more local power network models maintained at one or more substations may be synchronized as provided herein. In one example, the network control center may detect a power network model change (e.g., a power utility company may update a geographical information system (GIS), maintained by the network control center, with updated impedance, phase, geographical coordinates, and/or other information associated with the power grid). The network control center may update the global power network model based upon the power network model change. The network control center may send a power network model update to the first substation, and may instruct the first substation to update the first local power network model based upon the power network model update. The first substation may notify one or more peer substations (e.g., logically and/or physically connected substations, substations within a similar geographical territory, etc.) of the power network model update. In this way, the global power network model and one or more local power network models may be synchronized.

In another example, the first substation may detect a power network model change corresponding to a power grid event within a first power grid territory monitored by the first substation (e.g., the first substation may switch one or more consumers from a first feeder to a second feeder based upon a detected outage). The first substation may update the first local power network model based upon the power network model change (e.g., feeder data may be updated within the first power network model). The first substation may identify one or more peer substations that are peers of the first substation. The first substation may send a power network model update to the one or more peer substations, and may instruct the one or more peer substations to update local power network models, maintained at respective peer substations, based upon the power network model update. The first substation may send a power network model update to the network control center, and may instruct the network control center to update the global power network model based upon the power network model update.

In one example, the network control center may evaluate the power grid event (e.g., the switch from the first feeder to the second feeder by the first substation) associated with the power network model update with the global power network model to determine whether corrective action is to be take. For example, the network control center may use the global power network model to determine whether the power grid event was a desirable course of action (e.g., the second feeder may be overloaded based upon the feeder switch, which may be unknown to the first substation because the first local power network model may not comprise a complete view of the second feeder, such as feeder data for the second feeder associated with a territory not monitored by the first substation). The network control center may issue a control command defining the corrective action to one or more substations. The control command and/or corrective action may be incorporated into the global power network model and similarly propagated to one or more local power network models (e.g., that may be affected by the corrective action). In this way, the global power network model and one or more local power network models may be synchronized and/or execution of grid management applications may be distributed between the network control center and one or more substations.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
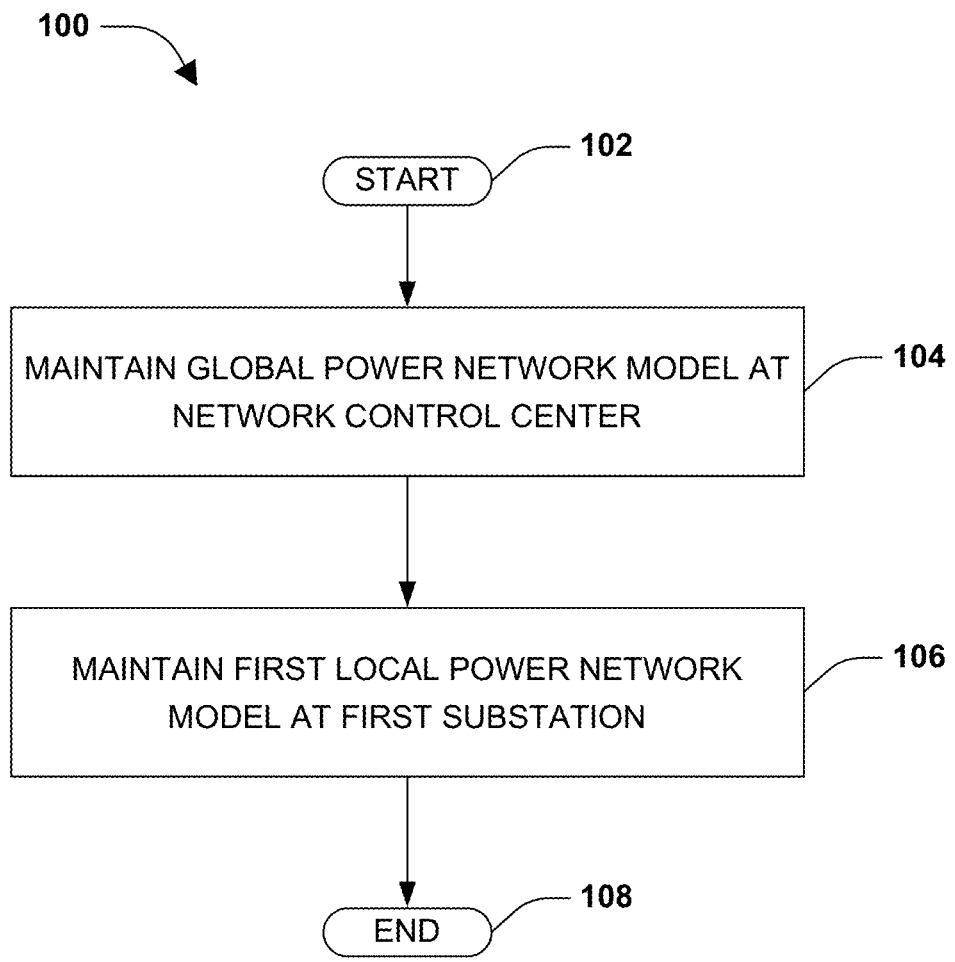
FIG. 1 is a flow diagram illustrating an exemplary method of maintaining a distributed electrical power network model associated with a power grid.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

A power grid may comprise one or more network control centers configured to manage substations within the power grid. A network control center may maintain a global power network model comprising a global logical representation of the power grid. Grid management applications, hosted by the network control center, may perform various tasks within the power grid based upon the global power network model (e.g., a network reconfiguration application may balance loads amongst one or more transformers within the power grid based upon load data and/or transformer data within the global power network model). A substation may comprise a substation computer configured to provide limited functionality for managing components within the power grid (e.g., the substation computer may implement PLC logic to manage components connected to the substation). Current substation computers may not have access to power network model information, and thus functionality provided by current substation computers may be limited.

Accordingly, as provided herein power network model information and/or execution of grid management applications may be distributed to one or more substations. That is, a substation may maintain a local power network model based upon at least some of the global power network model. The substation may host one or more local grid management applications configured to provide robust functionality for the power grid based upon the local power network model. The global power network model and the local power network model may be synchronized as provided herein. It may be appreciated that a variety of techniques may be employed to synchronize power network models. In one example, standardized communication protocols, such as Inter Control Center Protocol (ICCP), Multispeak, utility integration bus (UIB) technology, and/or other techniques may be used to send synchronization messages and/or data between substations and/or the network control center. In one example of synchronization between substations, data may be synchronized between a first substation and a second substation utilizing process bus technology, such as Distributed Network Protocol (DNP) 3.0 and/or electrical substation automation (e.g., IEC61850). In another example of synchronization between a substation and a network control center, the substation may comprise a network model management module configured to manage network model downloads and/or updates from the network control center for updating a local power network model on the substation. For example, an operator action within a distribution management system (DMS) on the network control center may trigger (e.g., based upon a change to the global power network model) an automated process to send a Common Information Model (CIM) message over ICCP from the network control center to the network model management module. The network model management module may store the local power network model within a shared memory so that local grid management applications executing on the substation may have access to the local power network model, for example.

One embodiment of maintaining a distributed electrical power network model associated with a power grid is illustrated by an exemplary method 100 in FIG. 1. At 102, the method starts. At 104, a global power network model may be maintained at a network control center configured to manage one or more substations associated with the power grid. The global power network model may comprise a global logical representation of the power grid. For example, the global power network model may comprise information corresponding to components within the power grid, such as transformers, circuit breakers, load changers, wires, etc. In this way, the network control center may host one or more grid management applications that may manage the power grid based upon the global power network model (e.g., a voltage and var control application may modify one or more parameters of a component within the power grid based upon voltage measurement data within the global power network model).

Power network model data may be distributed between the network control center (e.g., the global power network control model) and one or more substations (e.g., one or more local power network control models, which may be based upon at least some of the global power network control model). In this way, execution of grid management applications may be distributed between the network control center and the one or more substations (e.g., a local grid management application, hosted by a substation, may operate based upon a local power network model maintained by the substation). For example, the first substation may be configured to execute a local grid management application (e.g., a fault detection isolation restoration (FDIR) application, a network reconfiguration application, a voltage and var control application, a demand response control application, a power generation compensation application, etc.) based upon the first local power network model. In one example, execution priority may be assigned to the local grid management application over a grid management application hosted by the network control center. That is, many control decisions may be made based upon field data collected at substations, which may be stored within the first local power network model. In this way, the first substation may have up-to-date field data directly collected by the first substation before the network control center (e.g., the first substation may propagate the field data to the network control center for updating at a later point in time, which may result in higher latency for control decisions made by the network control center). Accordingly, local grid management applications on the first substation may be assigned execution priority to make decisions and/or send control signals to network distribution components within the power grid because the local grid management applications may have relatively low latency access to up-to-date field data for time-sensitive decisions, for example.

In one example, the first local power network model may be maintained at the first substation, at 106. The first local power network model may comprise a local logical representation of the power grid associated with the first substation (e.g., a first power grid territory monitored by the first substation). It may be appreciated that in one example, the first substation may comprise computational hardware capable of maintaining and/or utilizing the first local power network model, however, such computational hardware may be insufficient to maintain and/or utilize the global power network model. Accordingly, the first local power network model may be based upon at least some of the global power network model (e.g., data associated with the first power grid territory).

In one example of creating one or more local power network models, the network control center may obtain power grid partition information from respective substations managed by the network control center. Power grid partition information for a substation may define an area of responsibility for the substation (e.g., a first power grid territory for a first substation may comprise distribution network components and/or connectivity between such components). For example, substations may be partitioned (e.g., in overlapping partitions to provide for redundant monitoring and/or communication with distribution network components) based upon feeder boundaries of supplying substations. A distribution management system (DMS), for example, within the network control center may be configured to partition the global power network model into one or more local power network models for one or more substations based upon areas of responsibility of respective substations as provided by power grid partition information, for example. The DMS may commission the local power network models to the substations (e.g., during configuration of local grid management applications distributed to such substations). In one example, the DMS may maintain copies of the local power network models, which may be synchronized with the local power network models commissioned to the substations. Such synchronization may allow supplemental, redundant, and/or backup functionality to be performed between the network control center and the substations.

In one example of power network models (e.g., the global power network model and/or a first local power network model), a power network model may model distribution network components and/or connectivity between such components on a per phase basis. For example, a power network model may comprise a hierarchical representation of components and/or connectivity (e.g., a hierarchical representation comprising one or more power grid levels, a power grid level comprising one or more sub-areas, a sub-area comprising a plurality of substations, a substation connected to a plurality of feeders, a feeder feeding to a plurality of service transformers, and a service transformer providing service to one or more end customers). The power network model may comprise various data associated with the components and/or connectivity, such as geographic information system data (e.g., a GIS domain specifying impedance, phase, length, geographical coordinates and/or other information associated with distribution network components), distribution management system data (e.g., a DMS domain specifying real-time monitoring data of distribution network components), and/or other domains. In this way, a network control center may have a hierarchical understanding of distribution network components, connectivity between such component, and/or domain data based upon the global power network model. The first substation may similarly, for example, have a local hierarchical understanding of distribution network components monitored by the first substation, connectivity between such components, and/or domain data based upon the first local power network model.

The global power network model and one or more local power network models may be synchronized. In one example, the network control center may detect a power network model change within the power grid (e.g., an impedance of a wire within the power grid may be modified, a new wire may be added to the power grid, a voltage value may be measured, a transformer malfunction may be detected, etc.). For example, a power utility may update a geographical information system, maintained by the network control center, with updated impedance, phase, geographical coordinates, and/or other information associated with the power grid. The network control center may update the global power network model based upon the power network model change. The network control center may send a power network model update corresponding to the power network model change to the first substation with an instruction for the first substation to update the first local power network model based upon the power network model update. In this way, the first local power network model may be synchronized with the global power network model.

In another example, the network control center may receive a power network model update from the first substation. The power network model update may correspond to a power grid event within a first power grid territory monitored by the first substation (e.g., the first substation may have switched one or more customers from a first feeder to a second feeder). The network control center may update the global power network model based upon the power network model update. In another example, the network control center may evaluate the power grid event against the global power network model to determine whether the power grid event was a desirable course of action. Responsive to a determination that corrective action is to be taken based upon the evaluation (e.g., the second feeder may be overloaded), the network control center may issue a control command defining the corrective action to one or more substations (e.g., a second substation may be instructed to switch the one or more customers to a third feeder). At 108, the method ends.

Figure 2:
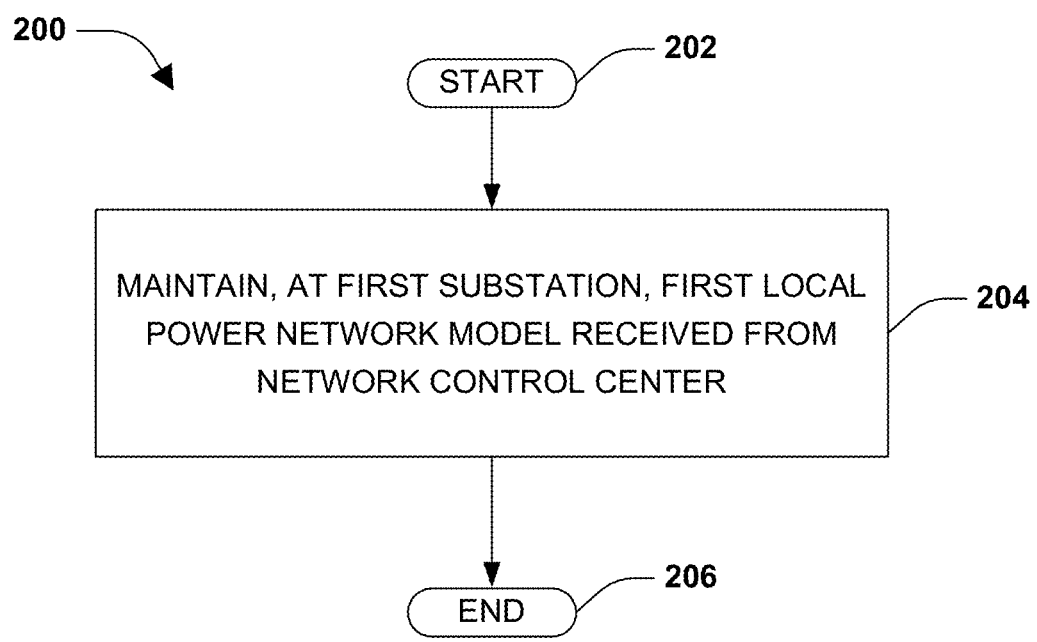
FIG. 2 is a flow diagram illustrating an exemplary method of maintaining a distributed electrical power network model associated with a power grid.

One embodiment of maintaining a distributed electrical power network model within a power grid is illustrated by an exemplary method 200 in FIG. 2. At 202, the method starts. At 204, a first local power network model may be maintained at a first substation. The first local power network model may have been received from a network control center configured to manage one or more substations associated with a power grid. The first local power network model may comprise a local logical representation of the power grid (e.g., representing a first power grid territory monitored by the first substation) based upon at least some of a global power network model maintained by the network control center. One or more local grid management applications hosted by the first substation may perform various functionality within the first power grid territory using the first local power network grid model.

The global power network model maintained by the network control center and one or more local power network models maintained by substations may be synchronized. In one example, the first substation may detect a power network model change corresponding to a power grid event within the first power grid territory monitored by the first substation (e.g., new measurement data may be collected by the first substation). The first substation may update the first local power network model based upon the power network model change. In one example, the first substation may identify one or more peer substations that are peers of the first substation (e.g., one or more logically and/or physically associated substations). The first substation may send a power network model update corresponding to the power network model change to the one or more peer substations, and may instruct the one or more peer substations to update local power network models, maintained at respective peer substations, based upon the power network model update. In another example, the first substation may send a power network model update to the network control center, and may instruct the network control center to update the global power network model based upon the power network model update. In another example, the first substation may receive a notification that a corrective action is to be taken based upon an evaluation by the network control center of the power grid event associated with the power network model update.

In another example, the first substation may receive a power network model update from the network control center. The power network model update may correspond to a power network model change within the power grid detected by the network control center (e.g., which may have been used by the network control center to update the global power network model). The first substation may update the first local power network model based upon the power network model update. The first substation may send a notification of the power network model update to one or more peer substations (e.g., so that the one or more peer substations may update local power network models maintained by respective peer substations).

In another example, the first substation may receive a power network model update from a second substation. The power network model update may correspond to a power grid event within a second power grid territory monitored by the second substation. The second power grid territory may be similar (e.g., at least partially overlap) or different than the first power grid territory. The first substation may update the first local power network model based upon the power network model update.

Figure 8:
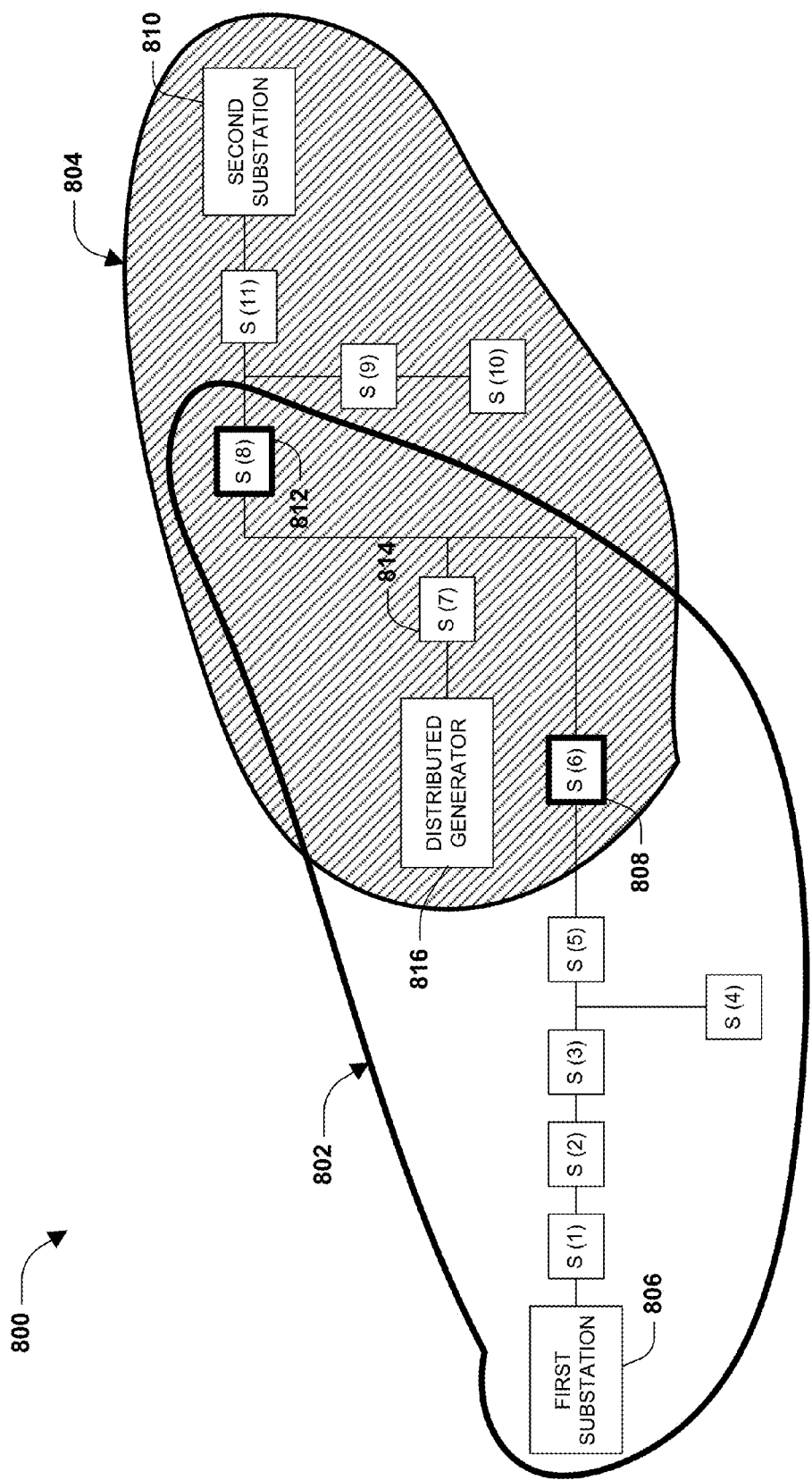
FIG. 8 is an illustration of an example of a first substation coordinating electricity distribution functionality with a second substation based upon overlapping local power network models.

In one example of overlapping power grid territories, the first power grid territory may correspond to a first feeder boundary (e.g., the first substation may be assigned to monitor and/or control distribution network components, such as feeders, within the first feeder boundary) and the second power grid territory may correspond to a second feeder boundary (e.g., the second substation may be assigned to monitor and/or control distribution network components, such as feeders, within the second feeder boundary) overlapping the first feeder boundary. Because the first and second substations may share feeder boundaries, first and second power network models may comprise shared information for overlapping components and/or connectivity within the shared feeder boundaries, which may be used by the first and second substations to coordinate functionality. Access to shared information within local power network models may allow for improved situational awareness between substations. In one example of utilizing shared information within local power network models, the first substation may detect a power grid disturbance (e.g., a sudden plugging-in of multiple electrical vehicles to feeders within the first feeder boundary, which may result in a capacity shortfall). The first substation may evaluate shared information within the first power network model (e.g., corresponding to the second power network model) to determine that the second substation has access to a healthy feeder with available power capacity. The first substation may send a request for the second substation to provide power to one or more customers affected by the capacity shortfall using the healthy feeder. In another example, the first substation may have a communication error with an intelligent electronic device (IED) within a shared feeder boundary with the second substation. The first substation may send a request for the second substation to communicate with the IED. The shared feeder boundary allows for communication redundancy between substations and network distribution components, such as IEDs. In this way, shared information between local power network models may allow for improved coordination between substations, for example. It may be appreciated that FIG. 8 illustrates an overlapping example. At 206, the method ends.

Figure 3:
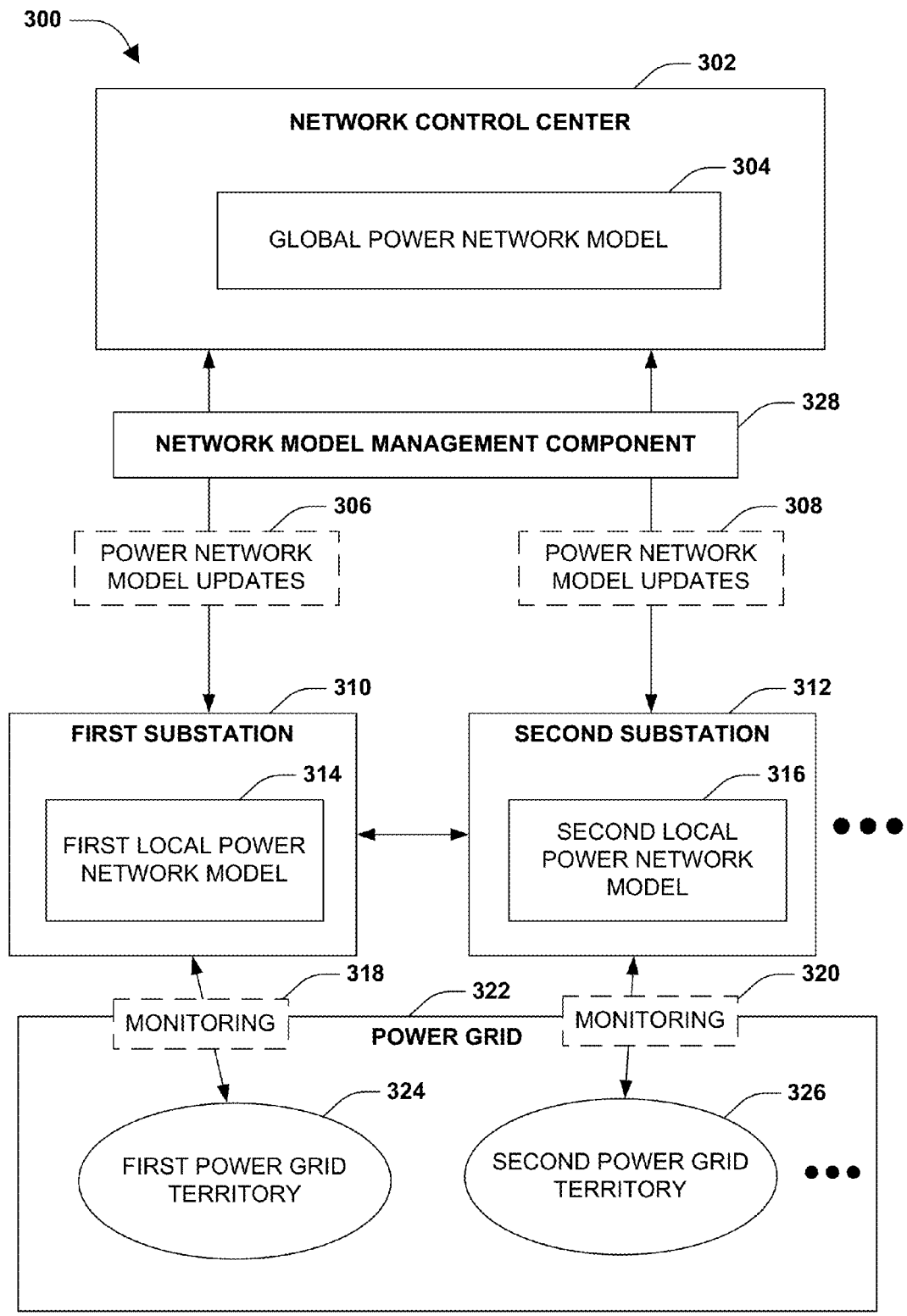
FIG. 3 is a component block diagram illustrating an exemplary system for maintaining a distributed electrical power network model associated with a power grid.

FIG. 3 illustrates an example of a system 300 configured for maintaining a distributed electrical power network model associated with a power grid 322. The system 300 may comprise a network model management component 328. The network model management component 328 may be configured to maintain a global power network model 304 at a network control center 302 configured to manage one or more substations (e.g., a first substation 310, a second substation 312, and/or other substations not illustrated) associated with the power grid 322. The global power network model 304 may comprise a global logical representation of the power grid 322. The network model management component 328 may be configured to maintain local power network models at one or more substations. For example, a first local power network model 314 may be maintained at the first substation 310. The first local power network model 314 may comprise a local logical representation of the power grid 322 associated with the first substation 310 (e.g., information describing one or more components within a first power grid territory 324 monitored 318 by the first substation 310). A second local power network model 316 may be maintained at the second substation 312. The second local power network model 316 may comprise a local logical representation of the power grid 322 associated with the second substation 312 (e.g., information describing one or more components within a second power grid territory 326 monitored 320 by the second substation 312).

The network model management component 328 may be configured to update the global power network model 304 based upon a first power network model update received from a substation (e.g., a power network model update 306 may be received from the first substation 310, a second network model update 308 may be received from the second substation 312, etc.). The first power network model update may identify a power grid event within the power grid 322, such as within the first power grid territory 324 and/or the second power grid territory 326. In this way, the global power network model 304 may be synchronized with the first local power network model 314 and/or the second local power network model 316.

The network model management component 328 may be configured to send a second power network model update to one or more substations based upon a power network model change within the power grid 322 (e.g., a power grid event detected by the network control center 302). The second power grid network model update may comprise a notification for a substation to update a local power network model based upon the second power network model update. In this way, the first local power network model 314 and/or the second local power network model 316 may be synchronized with the global power network model 304.

Figure 4:
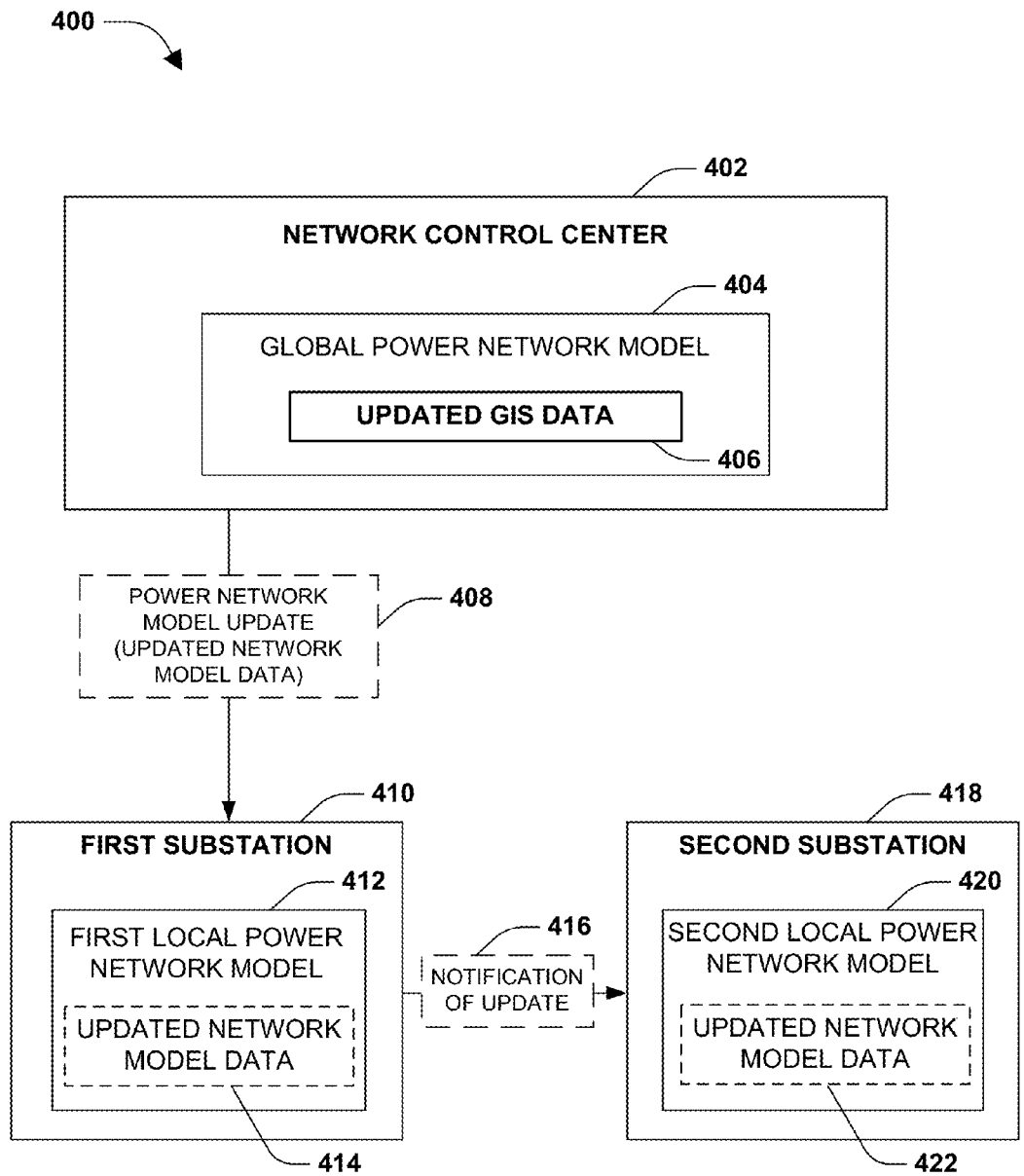
FIG. 4 is an illustration of a network control center propagating updated network model data typically comprising updated GIS data to a first substation.

FIG. 4 illustrates an example 400 of a network control center 402 propagating updated network model data that typically comprises updated GIS data 406 to a first substation 410 (e.g., although other data in addition to or alternative to updated GIS data may be comprised in updated network model data, even though a majority of such updated network model data is generally comprised of such updated GIS data). The network control center 402 may maintain a global power network model 404 comprising a global logical representation of a power grid. For example, the global power network model 404 may comprise geographical information system (GIS) data, such as geographical coordinates of components within the power grid, impedance of wires, phase, length, and/or a variety of other information associated with components within the power grid. In one example, the GIS data may be updated (e.g., by a power utility company) to create the updated GIS data 406. It may be advantageous to synchronize the updated GIS data 406 with one or more substations managed by the network control center 402.

A power network model update 408 comprising updated network model data (e.g., comprising updated GIS data 406) may be sent to the first substation 410. The first substation 410 may maintain a first local power network model 412, which may be based upon at least some of the global power network model 404. The first substation 410 my update the first local power network model 412 based upon the power network model update 408 to create updated network model data 414 local to the first substation 410 (e.g., at least some of the updated network model data 414 may comprise the updated GIS data 406). The first substation 410 may send a notification 416 of the power network model update 408 to a second substation 418 (e.g., a peer substation). The second substation 418 may maintain a second local power network model 420, which may be based upon at least some of the global power network model 404. The second substation 418 may update the second local power network model 420 based upon the notification 416 to create updated network model data 422 local to the second substation 418 (e.g., at least some of the updated network model data 422 may comprise the updated GIS data 406). In this way, power network model data may be synchronized between the network control center 402, the first substation 410, and/or the second substation 418. It may be appreciated that, although not illustrated, the updated network model data may be provided to a distribution management system (DMS)/supervisory control and data acquisition (SCADA) system (e.g., hosted by the network control center 402) prior to being propagated out to substations. For example, GIS data may be provided to the DMS/SCADA and this and/or other data may be updated in the DMS/SCADA, where the GIS and DMS/SCADA may, for example, comprise separate software systems (e.g., from different vendors).

Figure 5:
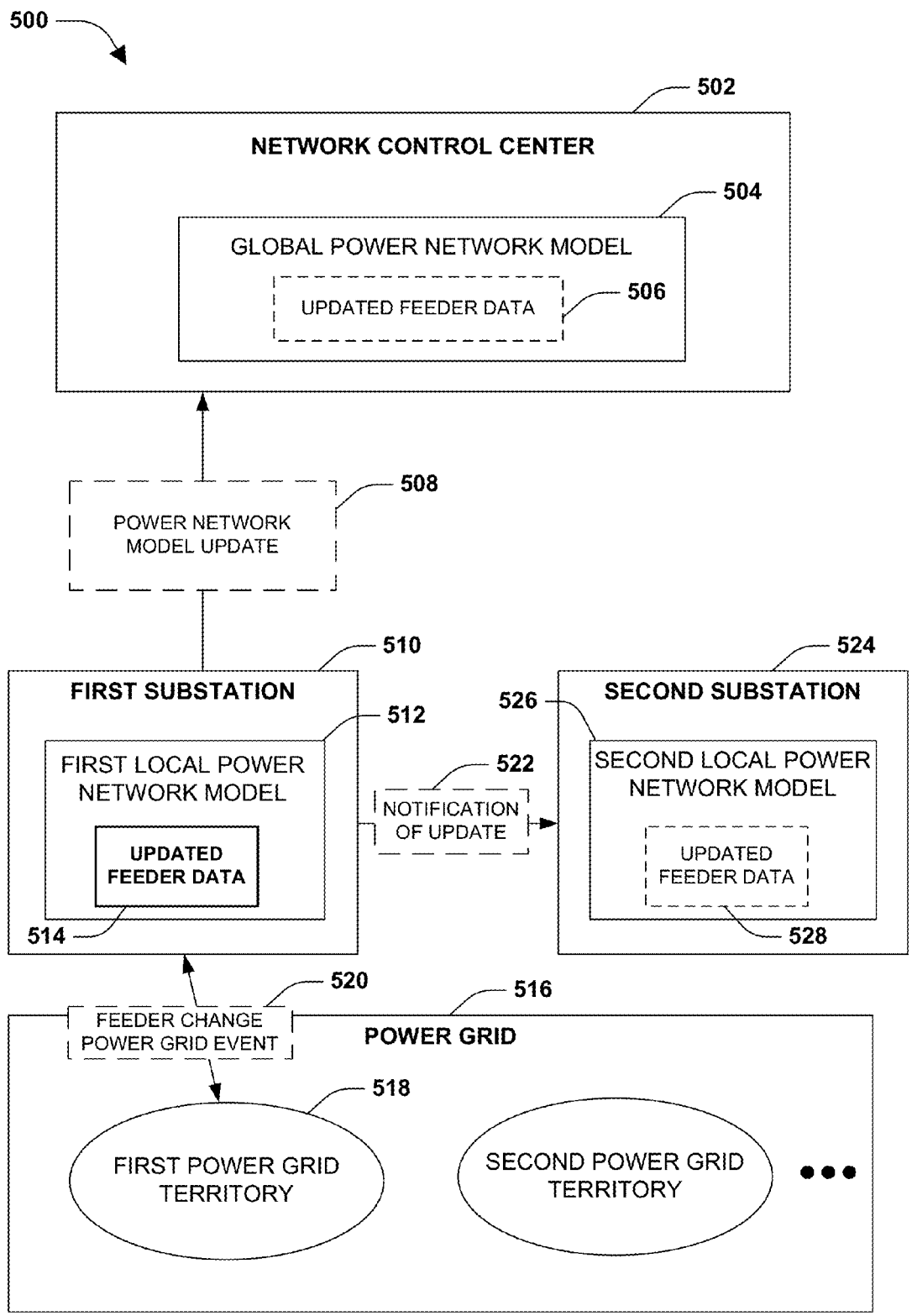
FIG. 5 is an illustration of a first substation propagating updated feeder data to a network control center and a second substation.

FIG. 5 illustrates an example 500 of a first substation 510 propagating updated feeder data 514 to a network control center 502 and a second substation 524. The first substation 510 may be configured to monitor a first power grid territory 518 within a power grid 516. For example, the first substation 510 may detect a fault within the first power grid territory 518, and may perform a control action to isolate the fault by switching one or more customers from a first feeder to a second feeder (e.g., feeder change power grid event 520). The feeder change power grid event 520 may be identified as a power network model change by the first substation 510. Accordingly, the first substation 510 may update a first local power network model 512 comprising a local logical representation of the first power grid territory 518 based upon the feeder change power grid event 520, resulting in the updated feeder data 514.

The first substation 510 may send a notification 522 of the power network model change representing the feeder change power grid event 520 to the second substation 524 (e.g., a peer substation). In this way, the second substation 524 may update a second local power network model 526 to comprise updated feeder data 528 based upon the notification 522. The first substation 510 may send a power network model update 508 to the network control center 502. The network control center 502 may update a global power network model 504 to comprise updated feeder data 506 based upon the power network model update 508. In this way, power network models maintained by the network control center 502, the first substation 510, and/or the second substation 524 may be synchronized.

Figure 6:
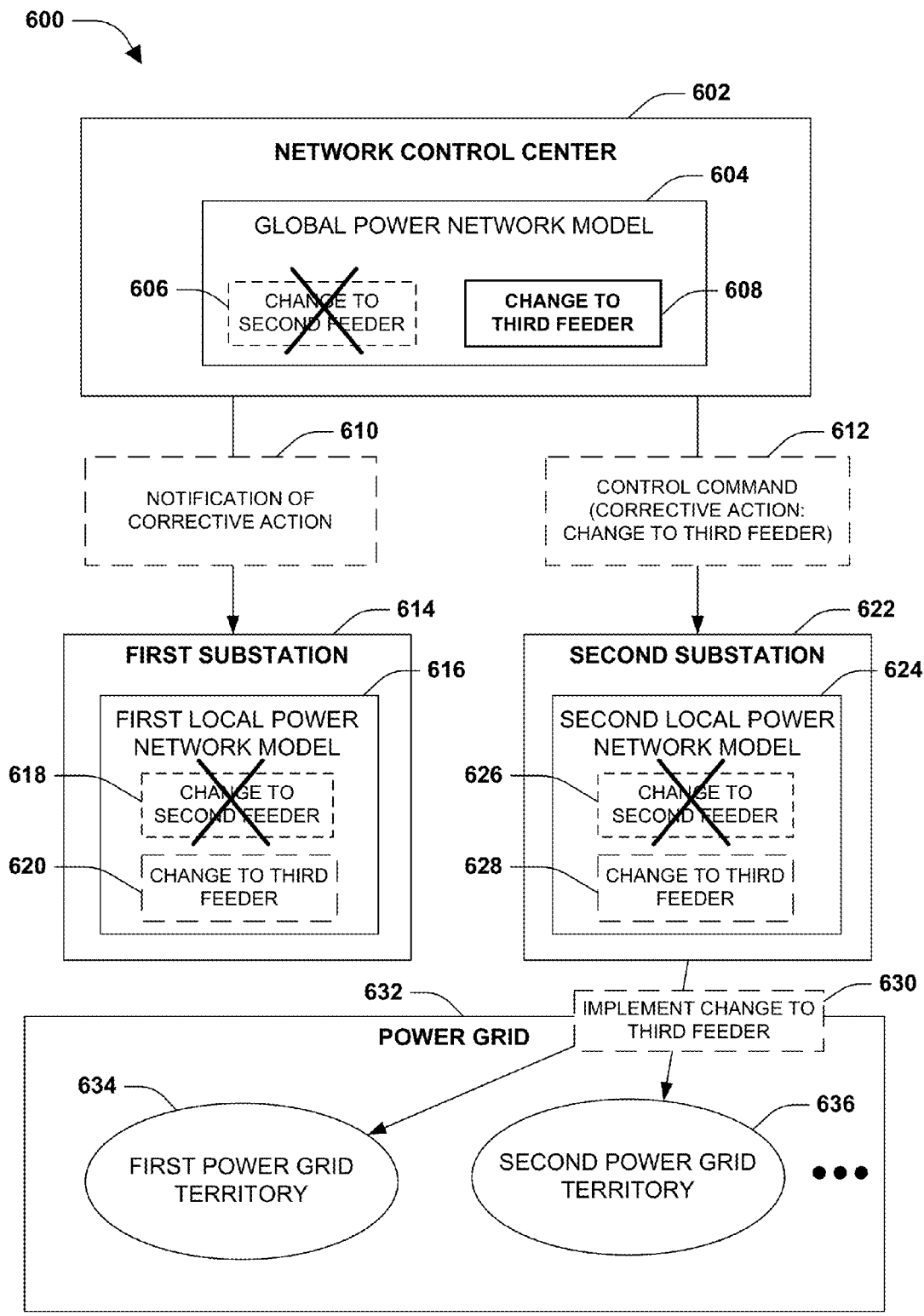
FIG. 6 is an illustration of a network control center issuing a control command to a second substation to perform a corrective action.

FIG. 6 illustrates an example 600 of a network control center 602 issuing a control command 612 to a second substation 622 to perform a corrective action 630. The network control center 602 may be configured to manage one or more substations associated with a power grid 632. The network control center 602 may maintain a global power network model 604 comprising a global logical representation of components within the power grid 632. The global power network model 604 may be synchronized with local power network models maintained by one or more substations (e.g., a first local power network model 616 maintained by a first substation 614 and a second local power network model 624 maintained by the second substation 622). In one example, the network control center 602 may receive a power network model update from the first substation 614 (e.g., power network model update 508 of FIG. 5). The power network model update may correspond to a power grid event within a first power grid territory 634. For example, the first substation 614 may have switched one or more customers from a first feeder to a second feeder based upon a detected fault. Accordingly, the first substation 614 may have updated the first local power network model 616 to comprise updated feeder data 618 for the second feeder, and may have propagated the power grid event to the network control center 602 and the second substation 622 for synchronization (e.g., the network control center 602 may have updated the global power network model 604 to comprise updated feeder data 606 for the second feeder and/or the second substation 622 may have updated the second local power network model 624 to comprise updated feeder data 626 for the second feeder).

The network control center 602 may be configured to evaluate the power grid event, performed by the first substation 614, with the global power network model 604 to determine whether the power grid event was a desired course of action. That is, additional information, unknown to the first substation 614, may be specified within the global power network model 604, which may be used to determine whether corrective action is to be taken. For example, the network control center 602 may determine that the power grid event of switching one or more customers from the first feeder to the second feeder may cause an overload for the second feeder. The network control center 602 may determine that the one or more customers are to be switched from the second feeder to a third feeder within a second power grid territory 636 monitored by the second substation 622.

Accordingly, the network control center 602 may update the global power network model 604 to comprise updated feeder data 608 for the third feeder (e.g., and/or remove the updated feeder data 606 for the second feeder). The network control center 602 may send the control command 612 defining the corrective action to the second substation 622 configured to monitor the third feeder within the second power grid territory 636. The second substation 622 may implement 630 the switch from the second feeder to the third feeder within the power grid 632. The second substation 622 may update the second local power network model 624 to comprise updated feeder data 628 for the third feeder (e.g., and/or remove the updated feeder data 626 for the second feeder). The network control center 602 may send a notification 610 of the corrective action to the first substation 614. The first substation 614 may update the first local power network model 616 to comprise updated feeder data 620 for the third feeder (e.g., and/or remove the updated feeder data 618 for the second feeder). In this way, the network control center 602 may issue control commands to correct power grid events that may not be desirable courses of action. It may be appreciated that alternatively or additionally the second substation 622 may send a notification to the first substation 614 of the corrective action to facilitate synchronization of the first local power network model 616.

Figure 7:
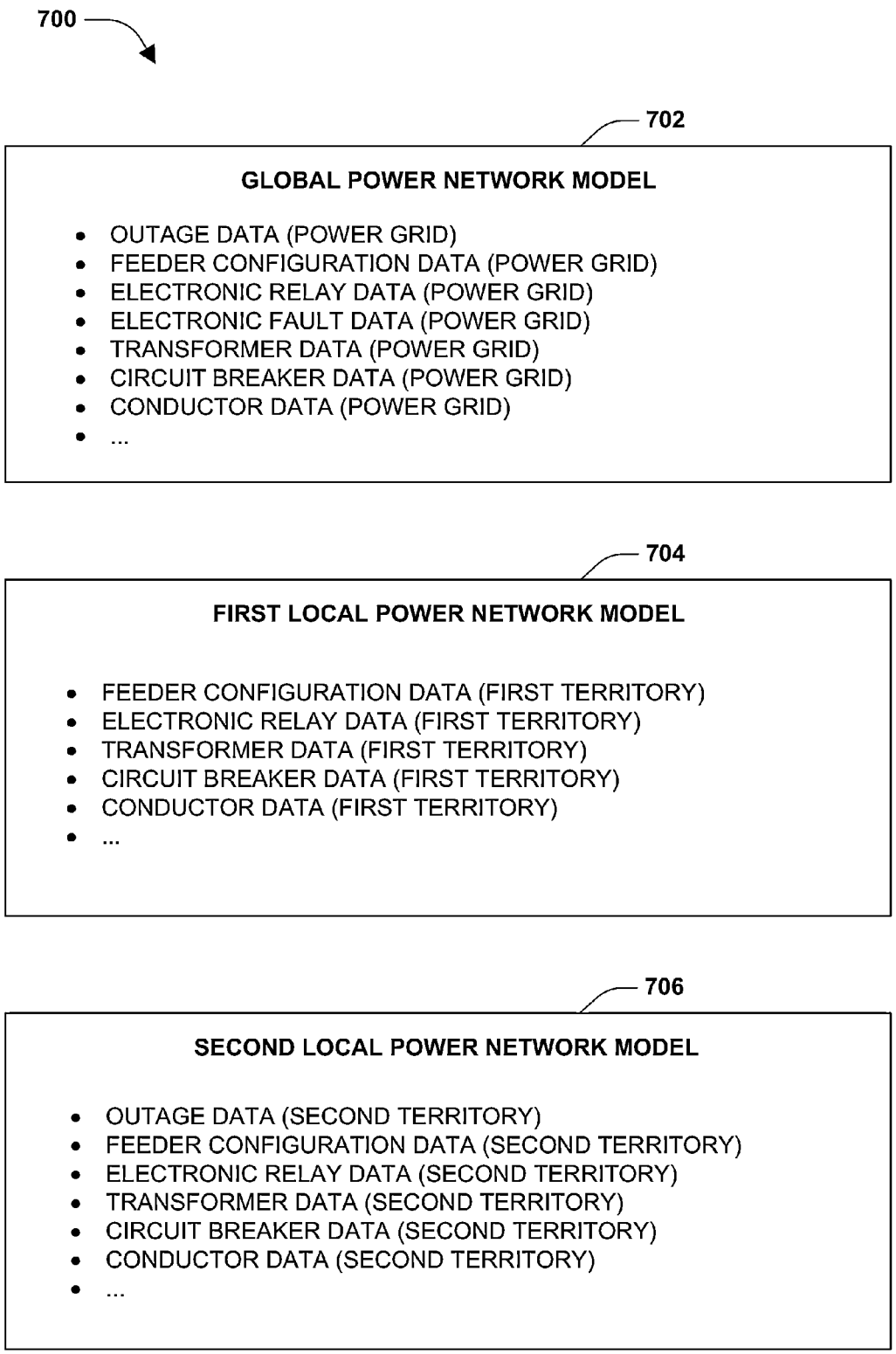
FIG. 7 is an illustration of a global power network model, a first local power network model, and a second local power network model.

FIG. 7 illustrates an example 700 of a global power network model 702, a first local power network model 704, and a second local power network model 706. A network control center may maintain the global power network model 702. The global power network model 702 may comprise a global logical representation of a power grid. For example, the global power network model 702 may comprise outage data, feeder configuration data, electronic relay data, transformer data, circuit break data, conductor data, and/or a variety of other data for the power grid. In this way, the network control center may host one or more global grid management applications that may utilize the global power network model 702. It may be appreciated that in one example, the global power network model 702 may comprise an amount of data that a substation (e.g., a substation computer) may be unable to store in memory and/or process. Accordingly, a substation may maintain a local power network model, which may be based upon at least some of the global power network model 702.

A first substation may maintain a first local power network model 704. The first local power network model 704 may comprise a local logical representation of a first power grid territory within the power grid (e.g., one or more components within the power grid that are monitored by the first substation). For example, the first local power network model 704 may comprise feeder configuration data, electronic relay data, transformer data, circuit breaker data, conductor data, and/or a variety of other data for the first power grid territory within the power grid. In this way, the first substation may host one or more local grid management applications that may utilize the first local power network model 704.

A second substation may maintain a second local power network model 706. The second local power network model 706 may comprise a local logical representation of a second power grid territory within the power grid (e.g., one or more components within the power grid that are monitored by the second substation). For example, the second local power network model 706 may comprise outage data, feeder configuration data, electronic relay data, transformer data, circuit breaker data, conductor data, and/or a variety of other data for the second power grid territory within the power grid. In this way, the second substation may host one or more local grid management applications that may utilize the second local power network model 706. It may be appreciated that different models may differ from one another, have non-overlapping portions of information, etc. For example, the second local power network model 706 comprises an entry for outage data (e.g., for the second territory) whereas the first local power network model 704 does not comprise such an entry (e.g., for the first territory).

FIG. 8 illustrates an example 800 of a first substation 806 coordinating electricity distribution functionality with a second substation 810 based upon overlapping local power network models. The first substation 806 may be configured to monitor (e.g., perform electricity distribution functionality for) an original first power grid territory comprising switch (1), switch (2), switch (3), switch (4), switch (5), and switch (6) 808. Switches (1)-(5) may be configured as normally closed, while switch (6) 808 may be configured as normally open because switch (6) 808 is a boundary switch. The second substation 810 may be configured to monitor (e.g., perform electricity distribution functionality for) an original second power grid territory comprising switch (11), switch (10), switch (9), and switch (8) 812. Switches (9)-(11) may be configured as normally closed, while switch (8) 812 may be configured as normally open because switch (8) 812 is a boundary switch.

It may be advantageous for the first substation 806 and the second substation 810 to monitor overlapping portions of the power grid because the first substation 806 and the second substation 810 may coordinate decision making for electricity distribution functionality (e.g., at least with regard to overlapping portions). Accordingly, a first local power network model may be assigned to the first substation 806 that extends the original first power grid territory to additionally comprise switch (7) 814, switch (8) 812, and/or a distributed generator 816. In this way, the first substation 806 may monitor a first power grid territory 802 comprising switch (1)-switch (8) and the distributed generator 816. A second local power network model may be assigned to the second substation 810 that extends the original second power grid territory to additionally comprise switch (7) 814, switch (6) 808, and/or the distributed generator 816. In this way, the second substation 810 may monitor a second power grid territory 804 comprising switch (6)-switch (11) and distributed generator 816. The first power grid territory 802 and the second power grid territory 804 comprise an overlap (e.g., a feeder boundary overlap) comprising switch (6) 808, switch (7) 814, switch (8) 812, and/or the distributed generator 816. In one example of assigning local power network models, the first and/or second local power network models may be assigned to the respective substations during setup of local grid management applications at the substations based upon islanding information associated with the distributed generator 816 (e.g., the distributed generator 816 may be supplying power in an islanding mode). In another example, the first and/or second local power network models may be updated from non-overlapping models to overlapping models.

In one example of coordinating electricity distribution functionality, a failure of the distributed generator 816 may be detected (e.g., by the first substation 806 and/or the second substation 810). The first substation 806 and the second substation 810 may coordinate recovery actions to open switch (7) 814 and close either switch (6) 808 or switch (8) 812 to supply power to loads between switch (6) 808 and switch (8) 812. The coordination between the first substation 806 and the second substation 810 may be performed by one or more first local grid management applications executing on the first substation 806 (e.g., a first local grid management application may utilize information within the first local power network model to determine whether to close switch (6) 808 or switch (8) 812 and/or perform other recovery actions) and/or one or more second local grid management applications executing on the second substation 810 (e.g., a second local grid management application may utilize information within the second local power network model to determine whether to close switch (6) 808 or switch (8) 812 and/or perform other recovery actions). For example, the first substation 806 may determine that there is a lack of resources to supply power to loads between switch (6) 808 and switch (8) 812, but that the second substation 810 may have available resources to supply such power. Accordingly, the first substation 806 may send a request to the second substation 810 to close switch (8) 812 in order to provide power to loads between switch (8) 812 and switch (6) 808. In this way, the first substation 806 and the second substation 810 may coordinate recovery actions (e.g., decision making functionality) to efficiently recover from the failure of the distributed generator 816, for example.

Figure 9:
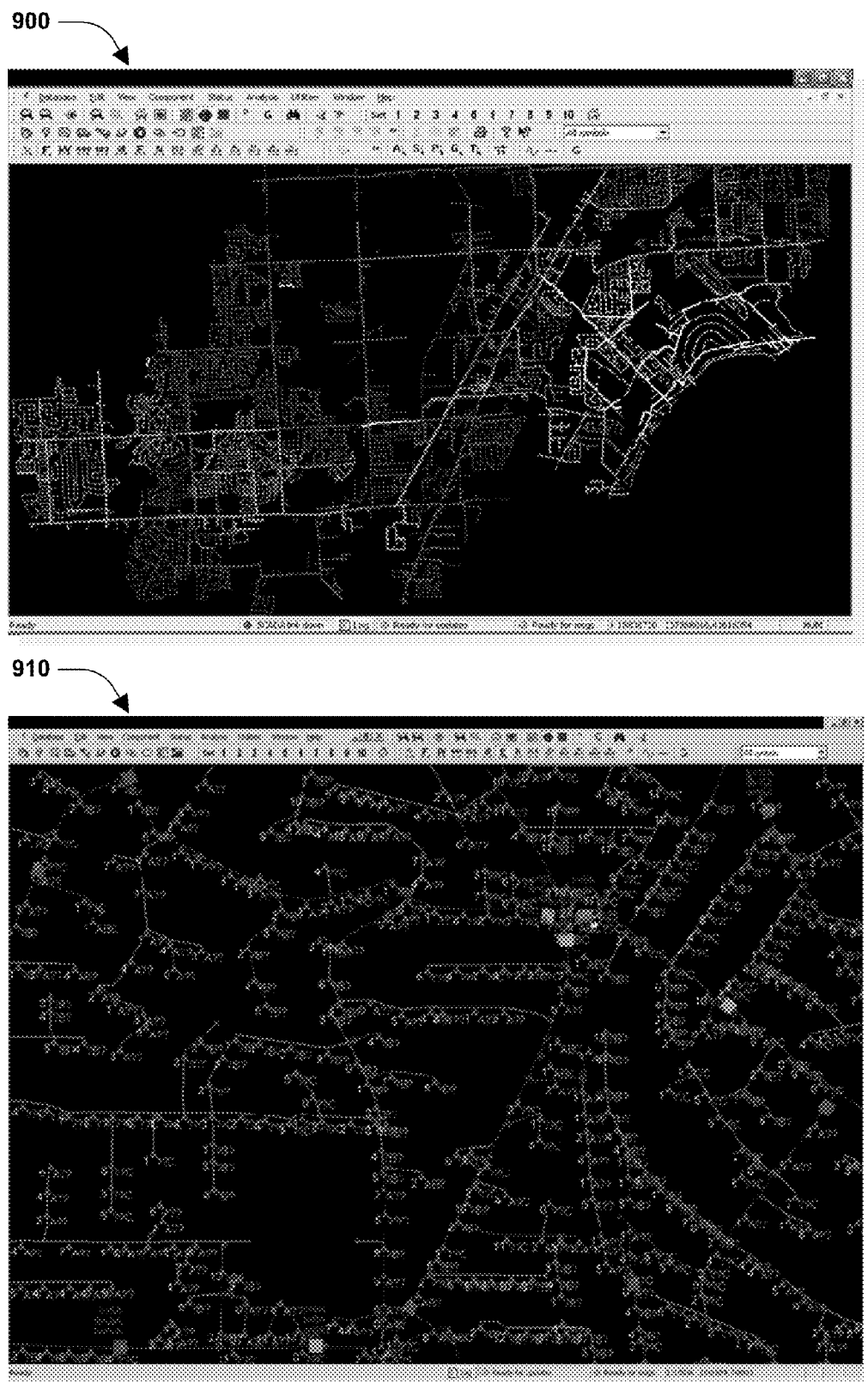
FIG. 9 is an illustration of an example of a first distribution management system screenshot and a second distribution management system screenshot.

FIG. 9 illustrates an example 900 of a first distribution management system screenshot 900 and a second distribution management system screenshot 910, such as may be presented on a monitor of an administrative console for a power grid. In one example, a network control center may host a distribution management system (DMS) configured to manage a power grid and/or substations associated with the power grid (e.g., the distribution management system may analyze information within a global power network model maintained by the network control center in order to send control commands to components, such as substations and/or other network distribution components, within the power grid). For example, the distribution management system may comprise one or more grid management applications configured to provide power distribution functionality for the power grid (e.g., fault detection isolation restoration (FDIR) applications, network reconfiguration applications, voltage var control applications, etc.). The first distribution management system screenshot 900 comprises a first view (e.g., a relatively zoomed-out view, such as a city view) of the power grid. The first view may illustrate one or more components within the power grid (e.g., customer systems, electric grid connections, electrical components, feeders, etc.). It may be appreciated that color coding, intensity, and/or other type of key, legend, etc. may be implemented to illustrate different feeders, service areas or territories, etc. and/or overlap there-between. The second distribution management system screenshot 910 comprises a second view (e.g., a relatively zoomed-in view) of the power grid. The second view may illustrate one or more components within the power grid (e.g., customer systems, electric grid connections, electrical components, feeders, etc.). In this way, the distribution management system may allow an administrator and/or an automated or semi-automated system, for example, to observe conditions within the power grid and/or send various control commands to components within the grid (e.g., illustrated within the first distribution management system screenshot 900 and/or the second distribution management system screenshot 910) within the power grid.

Figure 10:
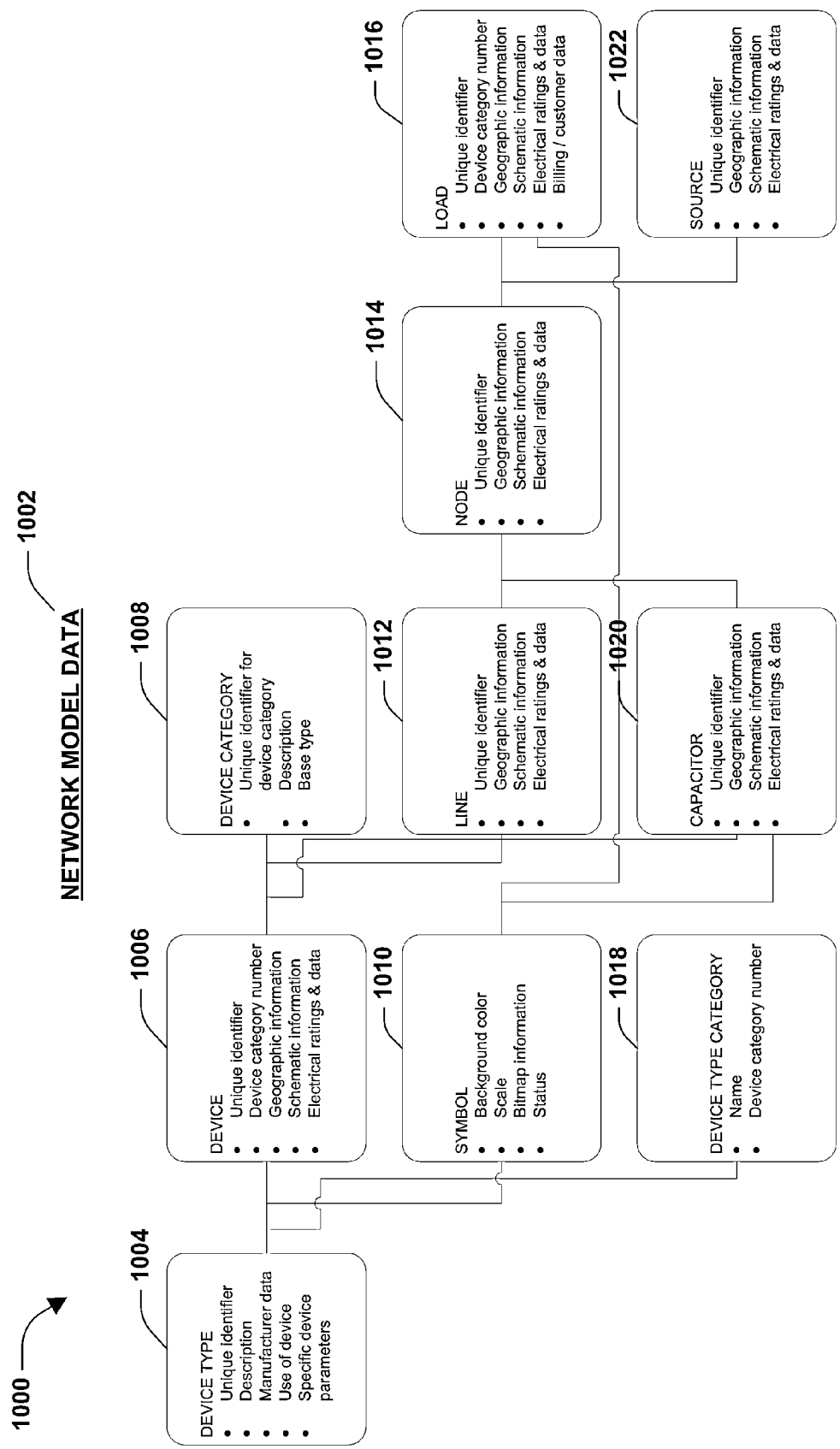
FIG. 10 is an illustration of an example of network model data.

FIG. 10 is an illustration of an example 1000 of network model data 1002 and/or a hierarchical arrangement thereof. A power network model (e.g., a global power network model maintained at a network control center, a local power network model maintained at a substation, etc.) may comprise network model data, such as at least some of network model data 1002. Network model data 1002 may comprise parameters and/or other information related to various components (e.g., devices, loads, sources, lines, capacitors, etc.) within a power grid, for example. The network model data 1002 may, for example, arrange parameters and/or other information within a database structure, such as a relational database comprising one or more tables, for example.

In one example, the network model data 1002 may comprise a device parameter 1006 that may represent a device within the power grid. The device parameter 1006 may specify a unique identifier for the device, a device category number, geographical information (e.g., a location, coordinates, measurements, etc. for the device), schematic information, electrical ratings and data, and/or other information relating to the device. The network model data 1002 may comprise a device type parameter 1004 corresponding to the device within the power grid. The device type parameter 1004 may specify a unique identifier, a description, manufacturer data, a use for the device, specific device parameters, and/or other information relating to the device. The network model data 1002 may comprise a device category parameter 1008 corresponding to the device. The device category parameter 1008 may specify a unique identify for the device category, a description for the device category, a base type, and/or other information relating to a category of the device. In this way, devices within the power grid may be represented by device parameters, device type parameters, device category parameters, and/or other parameters (e.g., a device type category parameter 1018 (e.g., comprising a name, device category number, etc.), a symbol parameter 1010 (e.g., comprising a background color, scale, bitmap information, status, etc.), etc.) within the network model data 1002.

The network model data 1002 may represent other components within the power grid, such as lines, nodes, loads, sources, capacitors, and/or other components. For example, the network model data 1002 may comprise a line parameter 1012 that may represent a line (e.g., a wire) within the power grid. The line parameter 1012 may specify a unique identifier for the line, geographical information (e.g., a location, coordinates, etc. for the line), schematic information, electrical ratings and data (e.g., an impedance measurement for the line, a length of the line, etc.), and/or other information relating to the line. In this way, one or more lines within the power grid may be represented by line parameters within the network model data 1002. The network model 1002 may comprise a capacitor parameter 1020 representing a capacitor within the power grid. The capacitor parameter 1020 may specify a unique identifier for the capacitor, geographical information (e.g., a location, coordinates, etc. of the capacitor), schematic information, electrical ratings and data (e.g., a capacitance measurement, etc.), and/or other information relating to the capacitor. In this way, one or more capacitors within the power grid may be represented by capacitor parameters within the network model data 1002. The network model data 1002 may comprise a node parameter 1014 representing a node within the power grid. The node parameter 1014 may specify a unique identifier for the node, geographical information (e.g., a location, coordinates, etc. of the node), schematic information, electrical ratings and data, and/or other information relating to the node. In this way, one or more nodes within the power grid may be represented by node parameters within the network model data 1002.

The network model data 1002 may comprise a load parameter 1016 representing a load within the power grid (e.g., the load may represent a customer that consumes power provided by the power grid). The load parameter 1016 may specify a unique identifier for the load, a device category number, geographical information (e.g., a location, coordinates, etc. of the load), schematic information, electrical ratings and data, billing and customer data, and/or other information relating to the load. In this way, one or more loads, such as customers, within the power grid may be represented by load parameters within the network model data 1002. The network model data 1002 may comprise a source parameter 1022 representing a source (e.g., a power source, such as a generator) within the power grid. The source parameter 1022 may specify a unique identifier for the source, geographical information (e.g., a location, coordinates, etc. of the source), schematic information, electrical ratings and data (e.g., one or more loads supplied by the source, power measurement data, etc.), and/or other information relating to the source. In this way, one or more sources within the power grid may be represented by source parameters within the network model data 1002.

The network model data 1002 may, for example, be used by grid management applications hosted by the network control center and/or local grid management applications hosted by the substation to manage components within the power grid. For example, a substation may maintain a local power network model that comprises at least some of the network model data 1002. A power distribution application (e.g., local grid management application) executing on the substation may, for example, utilize the network model data 1002 within the local power network model to perform power distribution functionality. For example, the power distribution application may evaluate information, such as power measurement data, specified within the source parameter 1022 for a source generator to determine that the source generator is overloaded. The power distribution application may switch one or more customers from the source generator to a second source generator that has available power resources to supply power to the one or more customers (e.g., a second source parameter, not illustrated, for the second source generator may be evaluated to determine that the second source generator has available power resources). In this way, the network model data 1002 may be utilized to manage components within the power grid, for example.

Figure 11:
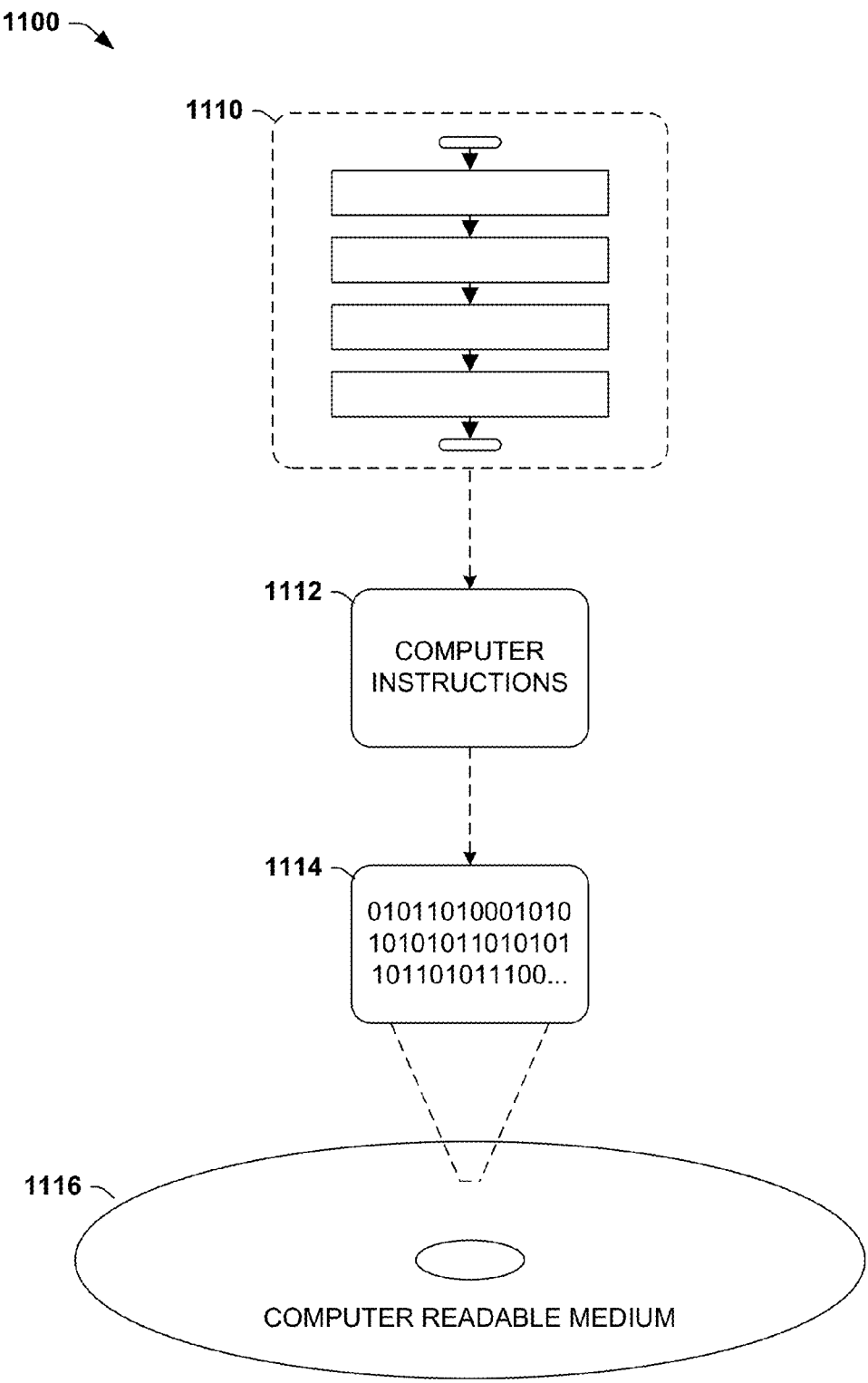
FIG. 11 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 11, wherein the implementation 1100 comprises a computer-readable medium 1116 (e.g., a CD-R, DVD-R, or a platter of a hard disk drive), on which is encoded computer-readable data 1114. This computer-readable data 1114 in turn comprises a set of computer instructions 1112 configured to operate according to one or more of the principles set forth herein. In one such embodiment 1100, the processor-executable computer instructions 1112 may be configured to perform a method 1110, such as at least some of the exemplary method 100 of FIG. 1 and/or at least some of the exemplary method 200, for example. In another such embodiment, the processor-executable instructions 1112 may be configured to implement a system, such as at least some of the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 12:
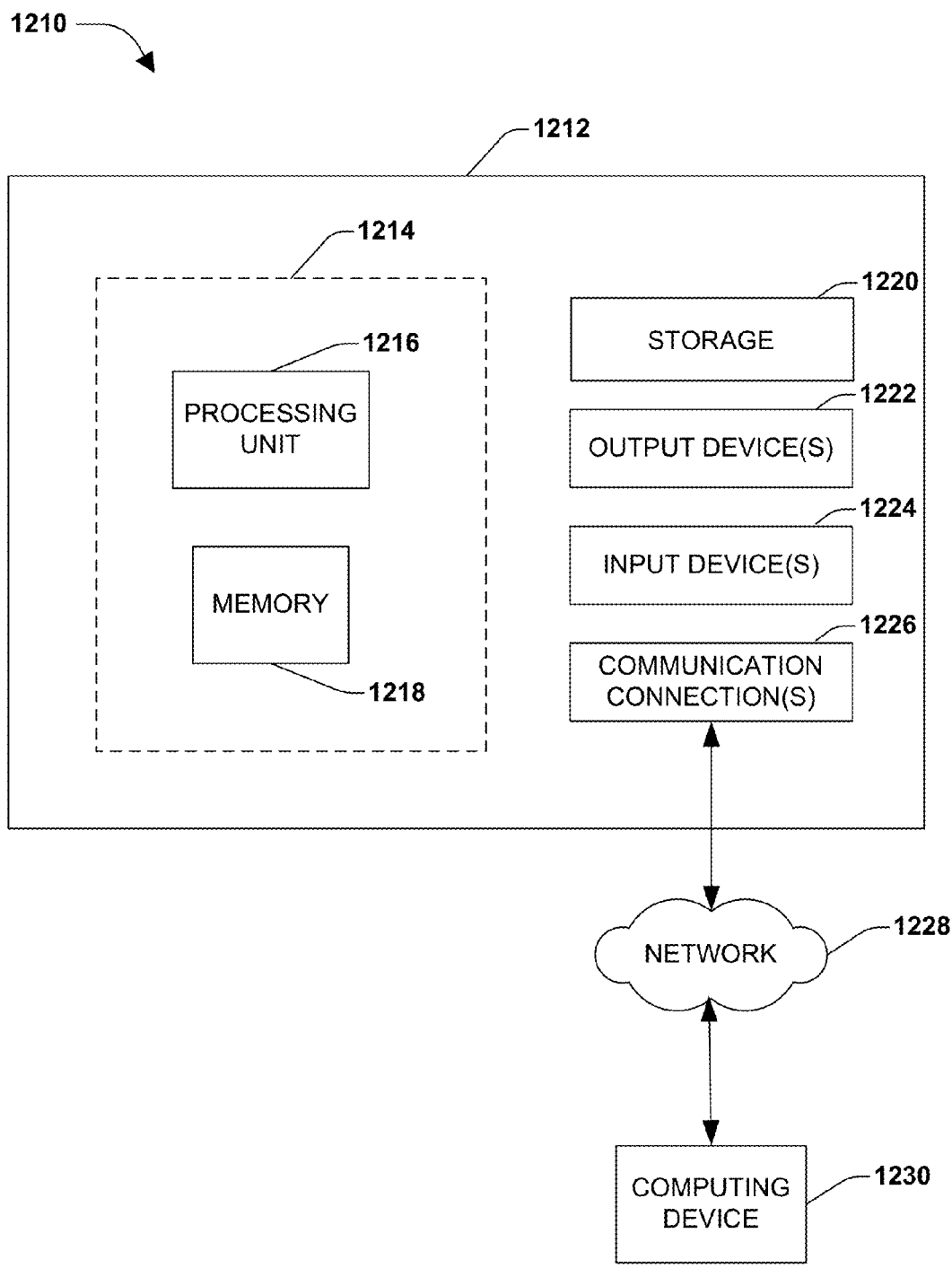
FIG. 12 illustrates an exemplary computing environment wherein one or more of the provisions set forth herein may be implemented.

FIG. 12 and the following discussion provide a brief, general description of a suitable computing environment to implement embodiments of one or more of the provisions set forth herein. The operating environment of FIG. 12 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 12 illustrates an example of a system 1210 comprising a computing device 1212 configured to implement one or more embodiments provided herein. In one configuration, computing device 1212 includes at least one processing unit 1216 and memory 1218. Depending on the exact configuration and type of computing device, memory 1218 may be volatile (such as random-access memory (RAM), for example), non-volatile (such as read-only memory (ROM), flash memory, etc., for example) or some combination of the two. This configuration is illustrated in FIG. 12 by dashed line 1214.

In other embodiments, device 1212 may include additional features and/or functionality. For example, device 1212 may also include additional storage (e.g., removable and/or non-removable) including, but not limited to, magnetic storage, optical storage, and the like. Such additional storage is illustrated in FIG. 12 by storage 1220. In one embodiment, computer readable instructions to implement one or more embodiments provided herein may be in storage 1220. Storage 1220 may also store other computer readable instructions to implement an operating system, an application program, and the like. Computer readable instructions may be loaded in memory 1218 for execution by processing unit 1216, for example.

The term "computer readable media" as used herein includes computer storage media. Computer storage media includes volatile and nonvolatile, removable and non-removable media implemented in any method or technology for storage of information such as computer readable instructions or other data. Memory 1218 and storage 1220 are examples of computer storage media. Computer storage media includes, but is not limited to, RAM, ROM, Electrically Erasable Programmable Read-Only Memory (EEPROM), flash memory or other memory technology, Compact Disc Read-Only Memory (CD-ROM), Digital Versatile Disks (DVDs) or other optical storage, magnetic cassettes, magnetic tape, magnetic disk storage or other magnetic storage devices, or any other medium which can be used to store the desired information and which can be accessed by device 1212. Any such computer storage media may be part of device 1212.

Device 1212 may also include communication connection(s) 1226 that allows device 1212 to communicate with other devices. Communication connection(s) 1226 may include, but is not limited to, a modem, a Network Interface Card (NIC), an integrated network interface, a radio frequency transmitter/receiver, an infrared port, a Universal Serial Bus (USB) connection, or other interfaces for connecting computing device 1212 to other computing devices. Communication connection(s) 1226 may include a wired connection or a wireless connection. Communication connection(s) 1226 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1212 may include input device(s) 1224 such as keyboard, mouse, pen, voice input device, touch input device, infrared cameras, video input devices, and/or any other input device. Output device(s) 1222 such as one or more displays, speakers, printers, and/or any other output device may also be included in device 1212. Input device(s) 1224 and output device(s) 1222 may be connected to device 1212 via a wired connection, wireless connection, or any combination thereof. In one embodiment, an input device or an output device from another computing device may be used as input device(s) 1224 or output device(s) 1222 for computing device 1212.

Components of computing device 1212 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1212 may be interconnected by a network. For example, memory 1218 may be comprised of multiple physical memory units located in different physical locations interconnected by a network.

Those skilled in the art will realize that storage devices utilized to store computer readable instructions may be distributed across a network. For example, a computing device 1230 accessible via a network 1228 may store computer readable instructions to implement one or more embodiments provided herein. Computing device 1212 may access computing device 1230 and download a part or all of the computer readable instructions for execution. Alternatively, computing device 1212 may download pieces of the computer readable instructions, as needed, or some instructions may be executed at computing device 1212 and some at computing device 1230.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
    maintaining a global power network model at a network control center configured to manage one or more substations associated with a power grid, the global power network model comprising a global logical representation of the power grid;
    receiving, at the network control center, a first power network model update from a first substation of the power grid, the first power network model update corresponding to a first power grid event at least partially in a first power grid territory associated with the first substation, the first power grid event comprising a switch of one or more consumers from a first feeder to a second feeder;
    evaluating, by the network control center, the first power grid event to determine whether the first power grid event was a desirable course of action; and
    responsive to determining, by the network control center, that the first power grid event was not a desirable course of action:
        sending a first notification of a corrective action to the first substation, the first notification comprising a first instruction for the first substation to update a first local power network model, the first local power network model comprising a first local logical representation of the first power grid territory with which the first substation is associated, the first local power network model based upon at least some of the global power network model; and
        sending a second notification of the corrective action to a second substation of the power grid, the second notification comprising a second instruction for the second substation to update a second local power network model, the second local power network model comprising a second local logical representation of a second power grid territory with which the second substation is associated, the second local power network model based upon at least some of the global power network model,
        the corrective action corresponding to a second power grid event at least partially in the second power grid territory.

2. The method of claim 1, comprising:
    updating the global power network model based upon the corrective action.

3. The method of claim 1, the evaluating comprising determining whether the first power grid event is associated with an overload of the second feeder.

4. The method of claim 1, the second power grid event comprising a switch of at least one of the one or more consumers to a third feeder.

5. The method of claim 1, the first substation configured to execute a local grid management application based upon the first local power network model, the local grid management application comprising at least one of a fault detection isolation restoration application (FDIR), a network reconfiguration application, a voltage and var control application, a demand response control application, or a power generation compensation application.

6. The method of claim 1, comprising:
    distributing execution of one or more grid management applications between the network control center and the one or more substations.

7. The method of claim 6, comprising:
    assigning execution priority to a local grid management application hosted by a substation over a grid management application hosted by the network control center.

8. The method of claim 1, the first power grid territory at least one of partially overlapping or different than the second power grid territory.

9. A method, comprising:
    maintaining, at a first substation of a power grid, a first local power network model, the first local power network model comprising a first local logical representation of a first power grid territory with which the first substation is associated, the first local power network model based upon at least some of a global power network model maintained by a network control center, the global power network model comprising a global logical representation of the power grid;

updating the first local power network model based upon a first power grid event at least partially in the first power grid territory, the first power grid event comprising a switch of one or more consumers from a first feeder to a second feeder;

sending, from the first substation, a first power network model update to the network control center, the first power network model update corresponding to the first power grid event; and receiving, at the first substation, a first notification of a corrective action from the network control center, the first notification comprising a first instruction for the first substation to update the first local power network model, the corrective action corresponding to a second power grid event at least partially in a second power grid territory with which a second substation of the power grid is associated.

10. The method of claim 9, the first power grid territory at least one of partially overlapping or different than the second power grid territory.

11. The method of claim 9, the second power grid event comprising a switch of at least one of the one or more consumers to a third feeder.

12. The method of claim 11, the first feeder and the second feeder in the first power grid territory and the third feeder in the second power grid territory.

13. The method of claim 9, comprising:
sending a second power network model update corresponding to the first power grid event to the second substation prior to receiving the first notification.

14. The method of claim 9, comprising:
receiving a second power network model update from the network control center; and
updating the first local power network model based upon the second power network model update.

15. The method of claim 14, comprising:
sending a notification of the second power network model update to the second substation.

16. The method of claim 9, comprising:
receiving a second power network model update from the second substation; and
updating the first local power network model based upon the second power network model update.

17. The method of claim 9, comprising:
detecting the first power grid event by obtaining power grid measurement data from an intelligent electric device feeder (IED feeder) indicating a state change within the first power grid territory.

18. The method of claim 9, the second power grid event comprising a switch of at least one of the one or more consumers from the second feeder to a third feeder.

19. A system, comprising:
a processor; and
memory comprising processor-executable instructions that when executed by the processor cause implementation of a network model management component configured to:
maintain a global power network model at a network control center configured to manage one or more substations associated with a power grid, the global power network model comprising a global logical representation of the power grid;
receive a first power network model update from a first substation of the power grid, the first power network model update corresponding to a first power grid event at least partially in a first power grid territory associated with the first substation, the first power grid event comprising a switch of one or more consumers from a first feeder to a second feeder;
evaluate the first power grid event to determine whether the first power grid event was a desirable course of action; and
responsive to determining that the first power grid event was not a desirable course of action:
send a first notification of a corrective action to the first substation, the first notification comprising a first instruction for the first substation to update a first local power network model, the first local power network model comprising a first local logical representation of the first power grid territory with which the first substation is associated, the first local power network model based upon at least some of the global power network model; and
send a second notification of the corrective action to a second substation of the power grid, the second notification comprising a second instruction for the second substation to update a second local power network model, the second local power network model comprising a second local logical representation of a second power grid territory with which the second substation is associated, the second local power network model based upon at least some of the global power network model,
the corrective action corresponding to a second power grid event at least partially in the second power grid territory.

20. The system of claim 19, the second power grid event comprising a switch of at least one of the one or more consumers from the second feeder to a third feeder.

* * * * *